United States Patent [19]

Matsumoto et al.

[11] Patent Number: 5,698,633
[45] Date of Patent: Dec. 16, 1997

[54] CHLOROPRENE RUBBER COMPOSITION AND CHLOROPRENE RUBBER COMPOSITION FOR VIBRATION DAMPING MATERIAL

[75] Inventors: Seiji Matsumoto, Shinnanyo; Tamotsu Sato, Kudamatsu, both of Japan

[73] Assignee: Tosoh Corporation, Yamaguchi-Ken, Japan

[21] Appl. No.: 561,703

[22] Filed: Nov. 22, 1995

[30] Foreign Application Priority Data

Dec. 15, 1994 [JP] Japan ................................. 6-312036

[51] Int. Cl.⁶ .................................................. C08L 11/00
[52] U.S. Cl. ................................................. 525/215
[58] Field of Search ........................................ 525/215

[56] References Cited

PUBLICATIONS

Chemical Patents Index, Documentation Abstracts Journal; Derwent Publications Ltd.; London, GB; English Abstract J63245449–A.

Primary Examiner—Mark L. Warzel
Attorney, Agent, or Firm—Sughrue, Mion, Zinn, Macpeak & Seas, PLLC

[57] ABSTRACT

A chloroprene rubber composition comprising the following polymers A and B in such a proportion that A is from 20 to 70 wt % and B is from 30 to 80 wt %:

A: a chloroprene polymer obtained by polymerization of chloroprene containing from 0 to 50 wt % of a comonomer copolymerizable with chloroprene, said polymer having a number average molecular weight of from 500 to 20,000; and B: a chloroprene polymer obtained by polymerization of chloroprene containing from 0 to 50 wt % of a comonomer copolymerizable with chloroprene, whereby with a 0.1 wt % tetrahydrofuran solution of said polymer, the weight of the polymer permeated through a filter having a pore diameter of 0.50 µm is less than 0.90 time of the weight of the polymer permeated through a filter having a pore diameter of 1.0 µm.

7 Claims, No Drawings

CHLOROPRENE RUBBER COMPOSITION AND CHLOROPRENE RUBBER COMPOSITION FOR VIBRATION DAMPING MATERIAL

The present invention relates to a chloroprene rubber composition. More particularly, it relates to a chloroprene rubber composition having excellent vibration damping properties and good processability and a chloroprene rubber composition for vibration damping material.

Various rubber materials including natural rubbers are widely used as base materials for vibration damping materials. However, inexpensive widely employed natural rubbers are poor in the weather resistance. On the other hand, butyl rubbers and silicone rubbers which are superior in the vibration damping properties to natural rubbers have problems with respect to the processability, the prices, etc.

In recent years, an attention has been drawn to vibration damping materials along with the trends for antiseismic structures for buildings, for low vibration and low noise in the field of information equipments and precision processing, and for smooth and quiet operation of transportation systems, and a further improvement is desired for the vibration damping properties. However, none of conventional base materials fully satisfies such a demand.

The vibration damping properties are usually evaluated by a loss factor (tan δ), and the vibration damping properties are believed to be improved by increasing the loss factor.

The present invention has been made in view of the above problems, and it is an object of the present invention to provide a chloroprene rubber composition having excellent vibration damping properties and good processability, and a chloroprene rubber composition for vibration damping material.

The present inventors have conducted extensive studies to solve the above problems and as a result, have found that a chloroprene composition comprising a chloroprene polymer having a low molecular weight and a chloroprene polymer whereby with a 0.1 wt % tetrahydrofuran solution of the polymer, the weight of the polymer permeated through a filter having a pore diameter of 0.50 μm is less than 0.90 time of the weight of the polymer permeated through a filter having a pore diameter of 1.0 μm, has good processability, and when such a composition is molded and vulcanized, a rubber vulcanizate having excellent vibration damping properties, can be obtained. The present invention has been accomplished on the basis of this discovery.

Thus, the present invention provides a chloroprene rubber composition comprising the following polymers A and B in such a proportion that A is from 20 to 70 wt % and B is from 30 to 80 wt %:

A: a chloroprene polymer obtained by polymerization of chloroprene containing from 0 to 50 wt % of a comonomer copolymerizable with chloroprene, said polymer having a number average molecular weight of from 500 to 20,000; and B: a chloroprene polymer obtained by polymerization of chloroprene containing from 0 to 50 wt % of a comonomer copolymerizable with chloroprene, whereby with a 0.1 wt % tetrahydrofuran solution of said polymer, the weight of the polymer permeated through a filter having a pore diameter of 0.50 μm is less than 0.90 time of the weight of the polymer permeated through a filter having a pore diameter of 1.0 μm. The chloroprene rubber composition of the present invention is useful for a vibration damping material.

Now, the present invention will be described in detail with reference to the preferred embodiments.

The comonomer for each of the chloroprene polymers A and B is not particularly limited so long as it is a monomer copolymerizable with chloroprene. For example, monovinyl compounds such as acrylonitrile, methacrylonitrile and vinylidene chloride, acrylic acid esters, methacrylic acid esters, aromatic vinyl compounds such as styrene and α-methylstyrene, and conjugated dienes such as 1,3-butadiene, 1-chloro-1,3-butadiene and 2,3-dichloro-1,3-butadiene, may be mentioned. These comonomers may be used alone or in combination as a mixture of two or more of them. Among them, trimethylol propane trimethacrylate and 2,3-dichloro-1,3-butadiene are particularly preferred. The content of the comonomer in each of the chloroprene polymers A and B is from 0 to 50 wt %. If the content exceeds 50 wt %, the nature of chloroprene rubber tends to be lost.

The number average molecular weight of the chloroprene polymer A is from 500 to 20,000. If it is less than 500, the processability of the chloroprene rubber composition for vibration damping material obtainable by the present invention, will be impaired. On the other hand, if it exceeds 20,000, the vibration damping properties tend to be impaired. Within the above range, particularly preferred is from 1,000 to 15,000. The proportion of the chloroprene polymer A in the chloroprene rubber composition is from 20 to 70 wt %. If it is less than 20 wt %, the vibration damping properties tend to be impaired, and if it exceeds 70 wt %, the processability tends to be impaired. Within the above range, particularly preferred is from 25 to 65 wt %.

The above chloroprene polymer B is a polymer whereby with a 0.1 wt % tetrahydrofuran solution thereof, the weight of the polymer permeated through a filter having a pore diameter of 0.50 μm is less than 0.90 time of the weight of the polymer permeated through a filter having a pore diameter of 1.0 μm. If it is 0.90 time or higher, the processability of the chloroprene rubber composition for vibration damping material obtainable by the present invention, tends to be impaired. Particularly preferably, it is less than 0.85 time. The proportion of the chloroprene polymer B in the chloroprene rubber composition is from 30 to 80 wt %. If it is less than 30 wt %, the processability tends to be impaired, and if it exceeds 80 wt %, the vibration damping properties tend to be impaired. Within the above range, particularly preferred is from 35 to 75 wt %.

The chloroprene polymer of the present invention can be produced by a conventional method such as emulsion polymerization, solution polymerization or bulk polymerization. For example, in the case of emulsion polymerization, it can be produced as follows.

A mixture comprising the monomer components for the above polymer and an optional amount of a molecular weight modifier, is mixed with an aqueous emulsifier solution and emulsified. To this emulsion, a polymerization initiator is added to conduct polymerization. At an optional level of conversion, a terminator is added to terminate the polymerization. The molecular weight modifier is not particularly limited, and for example, an alkylmercaptan such as n-dodecylmercaptan, tert-dodecylmercaptan or octylmercaptan, a xanthogen sulfide, benzyl iodide, or iodoform may be used. The emulsifier is not particularly limited, and an anionic surfactant such as an alkali metal salt of abietic acid, an alkali metal salt of disproportionated abietic acid, an alkali metal alkyl sulfate, an alkali metal alkylbenzene sulfonate, an alkali metal polyoxyethylene alkylphenyl ether sulfate, an alkali metal salt of a higher fatty acid, an alkali metal salt of a naphthalene sulfonic acid/formalin condensation product, or an alkali metal salt of a higher fatty acid sulfonate, or a nonionic surfactant such as a polyoxyethylene alkyl ether or a polyoxyethylene alkylphenyl ether, may, for example, be used. The polymerization initiator is not particularly limited, and an inorganic or organic peroxide such as potassium peroxide, ammonium peroxide, paramethane hydroperoxide, cumene hydroperoxide or tert-butyl hydroperoxide, a redox type agent having the above peroxide combined with a reducing agent such as ferrous sulfate, sodium hydrosulfite or sodium formaldehyde sulfoxylate (Rongalit), may, for example, be used. The terminator is not particularly limited, and a radical inhibitor, such as phenothiazine, 2,2-methylenebis-(4-methyl-6-tert-butylphenol), 2,2-methylene bis(4-ethyl-6-tert-butylphenol), 2,6-di-tert-butyl-4-methylphenol, hydroquinone, 4-methoxyhydroquinone or N,N-diethylhydroxylamine, may, for example, be used.

The temperature for the polymerization is not particularly limited, but it is usually preferably from 0° to 60° C., more preferably from 5° to 50° C. If it is difficult to control the temperature due to vigorous heat generation at the time of the polymerization, the polymerization may be conducted while adding a small amount of the polymer mixture continuously or in a divided fashion to the aqueous emulsifier solution.

After termination of the polymerization, an unreacted monomer in the latex may be removed by a method such as reduced pressure steam striping, followed by freeze solidification or salting out to isolate the polymer, which is then washed with water and dried to obtain the polymer.

To produce the chloroprene polymer A by the above described polymerization method, it is possible to employ a method of using a large amount of the molecular weight modifier or a large amount of the polymerization initiator. On the other hand, to produce the chloroprene polymer B, a polyfunctional monomer may, for example, be used as the copolymerizable monomer, or the conversion for termination of the polymerization may, for example, be adjusted at a level of at least 85%.

The chloroprene rubber composition or the chloroprene rubber composition for vibration damping material of the present invention is obtained by blending the above polymers A and B thus polymerized, in the state of latexes or in the state of isolated polymers.

The composition has good processability and can be molded and vulcanized in the same manner as for conventional chloroprene rubber. For example, the composition of the present invention may be mixed with a vulcanizing agent, a vulcanization accelerator, a reinforcing agent, a filler, a plasticizer, an antioxidant, a stabilizer, etc. by a kneading machine such a roll mill or a Banbary mixer, and the mixture is molded into a desired shape, followed by vulcanization. The obtained rubber vulcanizate for vibration damping material has excellent vibration damping properties and can be widely used for e.g. supports for antiseismic structures, supports for vibration generating objects such as industrial products, production installations or automobile engines or suspension apparatus for vehicles.

Now, the present invention will be described in further detail with reference to Examples. However, it should be understood that the present invention is by no means restricted by such specific Examples.

The number average molecular weight of a chloroprene polymer was determined by GPC (gel permeation chromatography). To determine the filter permeation weight ratio of a 0.1 wt % tetrahydrofuran solution of the polymer, the 0.1 wt % tetrahydrofuran solution was filtered through a filter having a pore diameter of 0.50 μm and through a filter having a pore diameter of 1.0 μm, respectively, and the respective filtrates are subjected to GPC analyses to obtain the respective peak areas, whereupon the filter permeation weight ration was represented by the ratio of (the peak area of the 0.50 μm filter filtrate)/(the peak area of the 1.0 μm filter filtrate). The processability of the chloroprene rubber composition was evaluated by the roll release property at the time of kneading the blend by a 8 inch roll mill. Further, the mechanical properties of the vulcanized rubber were evaluated in accordance with JIS K6301. The vibration damping properties were evaluated by determining a loss factor (tan δ) by a viscoelasticity measuring apparatus (spectrometer, manufactured by Iwamoto Seisakusho) at 23° C. under a condition of an initial strain of 5%, a displacement of ±1% and a vibration frequency of 1 Hz.

Polymerization Examples 1 to 3
(Polymers A1 to A3)

4 parts by weight of potassium salt of disproportionated abietic acid, 0.5 part by weight of a sodium salt of a naphthalene sulfonic acid/formalin condensation product, 0.2 part by weight of sodium hydroxide, 100 parts by weight of distilled water and a mixture of monomers and n-dodecylmercaptan as a molecular weight modifier, having a composition as identified in Table 1, were charged into a 2 l autoclave equipped with a stirrer, and the autoclave was sufficiently flushed with nitrogen. Then, while maintaining the temperature at 40° C., an aqueous potassium persulfate solution was continuously dropwise added to carry out the polymerization. When the conversion reached 70%, 0.05 part by weight of 2,2-methylenebis-(4-methyl-6-tert-butylphenol) was added to terminate the polymerization, and the remaining unreacted monomers were removed by reduced pressure steam stripping to obtain a latex.

A part of such a latex was added to methanol, whereupon precipitated polymer was recovered and dried to obtain a chloroprene polymer. The number average molecular weight of the polymer was measured and shown in Table 1.

Polymers thus obtained are designated as A1 to A3.

TABLE 1

|  | Polymer A | | | Polymer B | | | |
| --- | --- | --- | --- | --- | --- | --- | --- |
|  | Polymerization Example 1 Polymer A1 | Polymerization Example 2 Polymer A2 | Polymerization Example 3 Polymer A3 | Polymerization Example 4 Polymer B1 | Polymerization Example 5 Polymer B2 | Polymerization Example 6 Polymer B3 | Polymerization Example 7 Polymer B4 |
| Monomer composition (parts by weight) | | | | | | | |
| Chloroprene monomer | 100 | 95 | 100 | 100 | 98.8 | 100 | 100 |
| 2,3-Dichloro-1,3-butadiene | — | 5 | — | — | — | — | — |
| Trimethylolpropane trimethacrylate | — | — | — | — | 1.2 | — | — |
| n-Dodecylmercaptan | 4.9 | 3.9 | 0.8 | 0.13 | 0.13 | 0.13 | 0.22 |
| Conversion (%) at termination of polymerization | 70 | 70 | 70 | 90 | 93 | 70 | 70 |
| Number average molecular weight | 8000 | 10000 | 40000 | — | — | — | — |
| Filter permeation weight ratio | — | — | — | 0.76 | 0.81 | 0.98 | 0.99 |

Polymerization Examples 4 and 5 (Polymers B1 and B2)

The monomer mixtures as identified in Table 1 were polymerized and isolated in the same manner as in Polymerization Example 1 except that the conversion at termination was changed to 90 and 93%, respectively, to obtain chloroprene polymers. With a 0.1 wt % tetrahydrofuran solution of each polymer, the ratio of the weight of the polymer permeated through a filter having a pore diameter of 0.50 μm to the weight of the polymer permeated through a filter having a pore diameter of 1.0 μm, is shown in Table 1. Polymers thus obtained are designated as B1 and B2.

Polymerization Example 6 (Polymer B3)

The monomer mixture as identified in Table 1 was polymerized and isolated in the same manner as in Polymerization Example 1 except that 0.5 part by weight of sodium oleate was added as an emulsifier, to obtain a chloroprene polymer. With a 0.1 wt % tetrahydrofuran solution of this polymer, the ratio of the weight of the polymer permeated through a filter having a pore diameter of 0.50 μm to the weight of the polymer permeated through a filter having a pore diameter of 1.0 μm, is shown in Table 1. The obtained polymer is designated as B3.

Polymerization Example 7 (Polymer B4)

The monomer mixture as identified in Table 1 was polymerized and isolated in the same manner as in Polymerization Example 1 to obtain a chloroprene polymer. With a 0.1 wt % tetrahydrofuran solution of this polymer, the ratio of the weight of the polymer permeated through a filter having a pore diameter of 0.50 μm to the weight of the polymer permeated through a filter having a pore diameter of 1.0 μm, is shown in Table 1. The obtained polymer is designated as B4.

EXAMPLE 1

Latexes after removal of unreacted monomers, obtained in the above Polymerization Examples, were mixed to obtain a polymer composition as identified in Table 2, followed by freeze solidification, washing with water and hot air drying to obtain the desired chloroprene rubber composition.

The chloroprene rubber composition was blended into a formulation as identified in Table 3, which was kneaded by a 8 inch roll mill. The roll release properties at that time are shown in Table 2. Further, the blend was subjected to press vulcanization at 160° C. for 30 minutes to obtain a vulcanized rubber sheet. The physical properties and the loss factor (tan δ) of the vulcanizate are shown in Table 2. The results show that the roll release properties are good and the loss factor (tan δ) is high, which indicates that both good processability and excellent vibration damping properties have been accomplished.

TABLE 2

|  | Example 1 | Example 2 | Example 3 | Example 4 | Example 5 | Example 6 | Example 7 |
| --- | --- | --- | --- | --- | --- | --- | --- |
| Polymer composition (parts by weight) | | | | | | | |
| Polymer A1 | — | 25 | 50 | — | — | 50 | — |
| A2 | 65 | — | — | 60 | 50 | — | 30 |
| Polymer B1 | 35 | 75 | — | 40 | — | 50 | 70 |
| B2 | — | — | 50 | — | 50 | — | — |

TABLE 2-continued

|  | Example 1 | Example 2 | Example 3 | Example 4 | Example 5 | Example 6 | Example 7 |
|---|---|---|---|---|---|---|---|
| Processability |  |  |  |  |  |  |  |
| Roll release properties | ○ | ○ | ○ | ○ | ○ | ○ | ○ |
| Physical properties of vulcanized rubber |  |  |  |  |  |  |  |
| Hardness (JIS-A) | 65 | 65 | 66 | 67 | 67 | 67 | 66 |
| Tensile strength (MPa) | 11.2 | 10.6 | 10.4 | 11.0 | 11.2 | 10.6 | 11.5 |
| Elongation at breakage (%) | 440 | 450 | 400 | 430 | 420 | 410 | 430 |
| Loss factor (tan δ) | 0.38 | 0.36 | 0.38 | 0.38 | 0.37 | 0.39 | 0.36 |

TABLE 3

|  | (parts by weight) |
|---|---|
| Chloroprene rubber | 100 |
| Stealic acid | 1 |
| Santite S[1] | 3 |
| Carbon black | 40 |
| Nippuseal VN3[2] | 10 |
| Magnesium oxide | 4 |
| Zinc oxide | 5 |
| Naphthene oil | 10 |
| Ethylenethiourea | 1.5 |

[1] Purified special wax (manufactured by Siko Kagaku)
[2] Super fine particle silicic acid by wet method (manufactured by Nippon Silica Kogyo)

EXAMPLES 2 TO 7

Chloroprene rubber compositions having the compositions as identified in Table 2 were prepared in the same manner as in Example 1. Further, such chloroprene rubber compositions were vulcanized and evaluated in the same manner as in Example 1. The roll release properties, the mechanical properties and the loss factors (tan δ) are shown in Table 2, respectively. The results show that the roll release properties are good and the loss factors (tan δ) are high, which indicates that both good processability and excellent vibration damping properties have been accomplished.

COMPARATIVE EXAMPLES 1 to 6

Chloroprene rubber compositions having the compositions as identified in Table 4 were prepared in the same manner as in Example 1. Further, such chloroprene rubber compositions were vulcanized and evaluated in the same manner as in Example 1. The processability, the mechanical properties and the loss factors (tan δ) are shown in Table 4, respectively. The results show that it was impossible to accomplish improvement of the processability and improvement of the vibration damping properties simultaneously.

TABLE 4

|  | Comparative Example 1 | Comparative Example 2 | Comparative Example 3 | Comparative Example 4 | Comparative Example 5 | Comparative Example 6 |
|---|---|---|---|---|---|---|
| Polymer composition (parts by weight) |  |  |  |  |  |  |
| Polymer A1 | 10 | — | — | — | 80 | — |
| A2 | — | 80 | 35 | — | — | — |
| A3 | — | — | — | 50 | — | — |
| Polymer B1 | 90 | 20 | — | 50 | — | — |
| B2 | — | — | — | — | 20 | — |
| B3 | — | — | 65 | — | — | — |
| B4 | — | — | — | — | — | 100 |
| Processability |  |  |  |  |  |  |
| Roll release properties | ○ | X | X | ○ | X | ○ |
| Physical properties of vulcanized rubber |  |  |  |  |  |  |
| Hardness (JIS-A) | 66 | 59 | 65 | 64 | 61 | 70 |
| Tensile strength (MPa) | 11.0 | 10.8 | 16.8 | 14.5 | 10.2 | 19.0 |
| Elongation at breakage (%) | 470 | 480 | 450 | 440 | 480 | 350 |
| Loss factor (tan δ) | 0.29 | 0.40 | 0.38 | 0.30 | 0.39 | 0.28 |

From the foregoing results, it is evident that the chloroprene rubber compositions obtained by the present invention have good processability and excellent vibration damping properties.

What is claimed is:

1. A chloroprene rubber composition comprising the following polymers A and B in such a proportion that A is from 20 to 70 wt % and B is from 30 to 80 wt %:

A: a chloroprene polymer obtained by polymerization of chloroprene containing from 0 to 50 wt % of a comonomer copolymerizable with chloroprene, said polymer having a number average molecular weight of from 500 to 20,000; and B: a chloroprene polymer obtained by polymerization of chloroprene containing from 0 to 50 wt % of a comonomer copolymerizable with chloroprene, whereby with a 0.1 wt % tetrahydrofuran solution of said polymer, the weight of the polymer permeated through a filter having a pore diameter of 0.50 µm is less than 0.90 time of the weight of the polymer permeated through a filter having a pore diameter of 1.0 µm.

2. The chloroprene rubber composition according to claim 1, which is for a vibration damping material.

3. The chloroprene rubber composition according to claim 1, wherein the comonomer for each of A and B is at least one member selected from the group consisting of monovinyl compounds, acrylic acid esters, methacrylic acid esters, aromatic vinyl compounds and conjugated dienes.

4. The chloroprene rubber composition according to claim 1, wherein the comonomer for each of A and B is trimethylolpropane trimethacrylate, 2,3-dichloro-1,3-butadiene, or a mixture thereof.

5. The chloroprene rubber composition according to claim 1, wherein the number average molecular weight of the chloroprene polymer A is from 1,000 to 15,000.

6. The chloroprene rubber composition according to claim 1, wherein the chloroprene polymer A is from 25 to 65 wt %, and the chloroprene polymer B is from 35 to 75 wt %.

7. The chloroprene rubber composition according to claim 1, wherein with a 0.1 wt % tetrahydrofuran solution of the chloroprene polymer B, the weight of the polymer permeated through a filter having a pore diameter of 0.5 µm is less than 0.85 time of the weight of the polymer permeated through a filter having a pore diameter of 1.0 µm.

* * * * *